United States Patent [19]

Burdick

[11] Patent Number: 5,096,490
[45] Date of Patent: Mar. 17, 1992

[54] POLYMER/FATTY ACID FLUID SUSPENSION

[75] Inventor: Charles L. Burdick, Landenberg, Pa.

[73] Assignee: Aqualon Company, Wilmington, Del.

[21] Appl. No.: 516,444

[22] Filed: Apr. 30, 1990

[51] Int. Cl.$^5$ ................................. C08L 4/00
[52] U.S. Cl. ................... 106/171; 106/504; 106/416
[58] Field of Search ............ 106/416, 499, 504, 505, 106/171

[56] References Cited

U.S. PATENT DOCUMENTS

| | | | |
|---|---|---|---|
| 3,993,573 | 11/1976 | Gloss | 252/155 |
| 4,316,744 | 2/1982 | Bergna | 106/38.8 |
| 4,419,250 | 12/1983 | Allen et al. | 252/90 |
| 4,425,465 | 1/1984 | Padget et al. | 106/18.11 |
| 4,435,217 | 3/1984 | House | 106/189 |
| 4,454,260 | 6/1984 | Dawans et al. | 523/130 |
| 4,798,888 | 1/1989 | Symes et al. | 106/191 |
| 4,931,195 | 6/1990 | Cao et al. | 252/140 |

Primary Examiner—William R. Dixon, Jr.
Assistant Examiner—Sue Hollenbeck
Attorney, Agent, or Firm—James K. Luchs

[57] ABSTRACT

An improved thickening agent suitable for paper coating applications is a fluid suspension of 35 to 55 parts CMC or similar water soluble polymer in 40 to 55 parts fatty acid with 1 to 5 parts clay and up to 20 parts emulsifier. Handling convenience and thickening performance are improved.

8 Claims, No Drawings

POLYMER/FATTY ACID FLUID SUSPENSION

FIELD OF THE INVENTION

This invention relates to suspensions of water soluble polymers. In particular, the invention relates to polymers such as CMC suspended in a fatty acid.

BACKGROUND OF THE INVENTION

U.S. Pat. No. 4,454,260 describes a fluid stable suspension of water soluble polymer consisting of 40-140 parts of water soluble polymer dispersed in 100 parts of a liquid hydrocarbon medium to which 0.1-5 parts per 100 parts of hydrocarbon is added an alkali or alkaline earth metal salt of 6-33 carbon fatty acid as thickener. Other additives which are also specified for the suspension of this prior art include 0.1-10 parts of water, 0.1-50 parts of 1-12 carbon aliphatic alcohol and/or 0.1-50 parts of 2-12 carbon aliphatic diol per 100 parts of water soluble polymer.

The present invention differs from this prior art in the following regards:

A) The present invention employs the fatty acid in neat form and not in its salt form.

B) The present invention employs the fatty acid as liquid carrier for the suspension and not the thickening agent.

C) The present invention employs a proportion of fatty acid as the major ingredient, in excess of 40 wt. % of the suspension or greater than 100 parts of fatty acid per 100 parts of polymer, rather than a low proportion of 0.1-5 parts per 100 parts of polymer as given in the prior art of U.S. Pat. No. 4,454,260.

D) The present invention does not employ or require the use of aliphatic alcohol or water.

It is thus seen that the present invention differs substantially in composition and intent compared to the above prior art use of CMC and fatty acid in a fluidized suspension. The present invention thus could not have been anticipated from the prior art.

Prior art industrial use of CMC as a paper coatings thickener typically has not employed the direct addition of this thickening agent in its dry form to a paper coating formulation because in the case where dry powdered CMC is added directly to a paper coating formulation, severe lumping of the polymer is observed. Most prior industrial use of CMC as a paper coatings thickener has thus required the CMC to first be dissolved in water prior to its addition, in an aqueous solution form, to the paper coating formulation. However, this latter procedure suffers limitations in that it is laborious and time-consuming, and the highly viscous aqueous CMC solutions are difficult to prepare, store and handle. During the prior art procedure of adding powdered CMC to water to prepare aqueous solutions, CMC dust is often liberated. This can accumulate on floors where in the presence of water slipping hazards develop.

Another problem that is encountered with prior art use of CMC is that often during the course of preparation of CMC aqueous solutions, numerous undissolved gel lumps are formed due to the tendency of CMC to lump when added to dissolution water. These gel lumps then must either be stirred for a prolonged period of time in order to dissolve or must be filtered from the CMC solution before addition to the paper coating. Special mixing equipment may be required in order to prepare concentrated CMC solutions in water due to the high viscosity nature of these solutions.

Thus, the prior art use of CMC as a paper coatings thickener represented a difficult-to-use polymeric thickening agent. Therefore, it is evident that an improvement over the prior art use of CMC as a thickener for paper coatings would be useful and desired in the industry. The present invention, a fluid pourable suspension of CMC in fatty acid liquid organic media, has been found to offer a significant improvement over prior art handling and performance of CMC for paper coatings thickening application.

SUMMARY OF THE INVENTION

An improved thickening agent is a fluid suspension comprising 35 to 55 parts by weight of at least one particulate water soluble polymer dispersed and suspended in 40 to 55 parts by weight of a fatty acid liquid carrier and 1 to 5 parts by weight of an organoclay stabilizing agent and up to 20 parts by weight of an oil in water emulsifier.

A preferred polymer is CMC and a preferred fatty acid is a oleic and linoleic acid mixture as a fluid suspension in paper coating formulations for both handling convenience and thickening performance.

DETAILED DESCRIPTION OF THE INVENTION

The polymer/fatty acid fluid suspension of the present invention can be added directly to a given paper coating formulation (that typically consists of water, pigments, binder, and other additives) and is observed to disperse without lumps into the coating formulation then to thicken rapidly, imparting desired rheological characteristics to the coating. The present invention thus represents a form of CMC thickener that has significantly improved ease-of-use compared to the prior art use of CMC for the thickening of paper coatings.

The compositions of the present invention include the four primary ingredients of polymer, fatty acid, an organoclay stabilizing agent and an emulsifying agent. The polymer may be hydroxyethyl cellulose (HEC), carboxymethylcellulose (CMC), methylcellulose (MC), hydroxypropylmethyl cellulose (HPMC), ethylhydroxyethylcellulose (EHEC), hydrophobically modified hydroxyethyl cellulose (HMHEC), polyvinylpyrrolidone (PVP), polyethylene oxide (PEO), xanthan, cationic hydroxyethylcellulose (CATHEC), hydroxypropylguar (HP Guar), guar, polyvinylalcohol (PVA), polyacrylamide, sodium alginate or Carbopol ® acrylamide thickening composition. The polymer should have a particle size ranging from 1 to 150 microns average size.

Sodium carboxymethylcellulose (CMC) useful for the practice of the present invention is available from a variety of sources. The CMC component of the present invention employed in examples 1-3 below was CMC 7LX (Aqualon Company, Wilmington, Del.,) which typically expresses a carboxymethyl degree of substitution of from 0.65-0.80 and aqueous solution viscosities in the range of from 200-1000 cps at a concentration of 5 wt. % in water. The particle size distribution of the CMC-7LX would be described as "fine" in nature with approximately 90% of particle size less than US 100 mesh (149 micron) in size. Fine particle size of the CMC incorporated in the present invention is desirable for improved time-stability with less particle settling tendency of the suspension. It is obvious that a complete variety of other commercial and experimental CMC types, besides the CMC-7LX in the examples 1-3 below, would also be applicable in this invention. These other CMC types applicable in the present invention would include a broad spectrum of molecular weights and various degrees of carboxymethyl substitution. Fine particle size of these latter CMC samples would be desirable for use in the present invention in order to achieve optimum suspension stabilities. The CMC component of the present invention is incorporated in the suspension at a proportion of 35-55 parts by weight in a total suspension weight of 100 parts.

Methylcellulose (MC), hydrophobically modified hydroxyethyl cellulose (HNHEC) and hydroxyethylcellulose (HEC) are also available from the Aqualon Company. Sodium alginate is available from Kelco Inc. Carbopol® cross-linking composition is a thickening composition available from Goodrich Inc. Ethylhydroxyethylcellulose is available from Berol Nobel. Hydroxypropylmethylcellulose is available from Aqualon and Dow.

The fatty acid component of the present invention is typically employed at a proportion of from 40-55 parts by weight in a total of 100 parts of the suspension. This component of the present invention preferably consists of such fatty acids as oleic acid, linoleic acid, and mixtures of these two. These acids may be derived from tall oil or from vegetable sources.

A low titre value is required in the fatty acid of the present invention so that the CMC suspension retains fluidity at normal storage and use temperatures of $>10°$ C. The fatty acid component can contain small proportions of palmitic, stearic, and rosin acids so long as these products do not excessively increase the titre of the fatty acid liquid to $>10°$ C.

Fatty acid is preferred as the fluid carrier of the present invention due this organic liquid's unique ability to become saponified and thus extremely well-dispersed in paper coating formulations that typically are practiced at pH values of from 8-10. Fatty acid is also preferred as an organic carrier in the present invention due to the well-documented ability of this chemical species to adsorb to the paper coatings pigments, such as calcium carbonate and kaolin clay, that are typically employed in commercial paper coatings formulations. This ability of fatty acid liquid carrier of the present invention to adsorb to paper coatings pigments may be advantageous in conferring desirable final properties to the paper coating formulation as is discussed in the "Examples" section below.

The organoclay component of the present invention discussed in the examples section consists of "TIX-O-GEL TE" (United Catalysts) which is described in company literature as bentonite clay stabilized with dimethyldioctadecylammonium ion. The proportion of organoclay in the present invention may be varied typically in amounts in the formulation ranging from 1 to 5 parts by weight in a total suspension of 100 parts. The organoclay component of the present invention acts as both a stabilizer and as a thickener of the present invention and thus the level of clay may be adjusted to provide both the degree of stability and the desired level of viscosity to the final CMC suspension product. It is desired that the present invention suspension viscosity not be so high that pumping and handling would be difficult in industrial practice, but high enough to confer upon the suspension stability to settling of suspended CMC particles for a reasonable period of time, such as at least one month's storage at ambient temperature.

The ratio of organoclay is adjusted to provide a pourable consistency to the suspension that would be in the range of about 200-10,000 cps Brookfield viscosity.

It is evident that, in addition to the above-described TIX-O-GEL organoclay example, other oil-dispersible clay species, such as bentonite modified with other lipophiles, could be suitable substitutes in the present invention.

The emulsifier component of the present invention is incorporated in order to impart faster dispersibility to the invention when added to aqueous paper coating formulations. Triton® X-100 (Rohm and Haas) is presented in the Examples section as one possible such emulsifier for this invention. It is obvious that any number of other oil-in-water emulsifiers would also be suitable for this purpose. A total weight for effective emulsifier ratios estimated to be up to 20 parts by weight in a total suspension weight of 100 parts. Preferred amounts of one or more emulsifier agents are in the order of 1 to 10 parts by weight.

Suitable oil in water emulsifier agents improve the dispersibility of the CMC/fatty acid suspension. While a wide variety of these emulsifier agents would be suitable alone or in combinations; Triton® X-100 from Rohm & Haas, Span 20 from ICI Americas Inc., Alipal® CO-436 from GAF and Igepal® CO-630 from GAF have all provided excellent results in improving dispersibility of the CMC/fatty acid suspension. The preferred emulsifier agents are nonionic.

In addition to the four above-described primary ingredients in the present invention, a number of other potential ingredients could obviously also be incorporated into the CMC in fatty acid suspension in order to impart additional performance characteristics that may be desired. These optional ingredients could include such species as water, oils, polymer lattices, other water-soluble thickening agents (such as cellulose ethers, polyacrylamide, guar gum, and alkali-soluble latexes), and pigments.

The following examples illustrate the practice of the invention without being limiting. The invention has industrial applicability as a thickening and suspending agent in oil drilling, mineral processing, cosmetics, building products and paints.

EXAMPLE 1

Fifty-three parts by weight of Pamak® 4 fatty acid (Hercules Incorporated, Wilmington, Del.) was added to a beaker; then sequentially 3 parts by weight of Triton® X-100 (Rohm and Haas) was added to the beaker with stirring, followed by 3 parts by weight of TIX-O-GEL TE (United Catalysts). After this 40 parts by weight of CMC-7LX, lot 9928-28 (Aqualon Company) was added to the beaker and stirred briefly to disperse. Finally, 1 part by weight of Sylox® 15 amorphous silica (W. R. Grace) was added to the beaker and stirred briefly to disperse. The final product was observed to be a fluid pourable suspension and was designated 0071-36-2. This product was measured to exhibit a Brookfield viscosity of 9,500 centipoise (LVT viscometer, #4 spindle/12 RPM). The sample 0071-36-2 upon prolonged storage of four weeks remained fluid and pourable with no perceptible settling of the suspended CMC solids.

For comparative purposes, CMC-7LX, lot 9928-28, aqueous solutions were prepared at solids levels of 8.3% and 10% in water by adding the dry CMC-7LX powder to a weighed quantity of water while stirring under high shear according to the prior art. In both of these cases, lumping of the CMC-7LX powder upon addition to the water was observed to occur. The so-formed lumps of CMC required at least one hour of stirring before these appeared to have dissolved to form uniform solutions. The overnight Brookfield viscosities of the two CMC solutions were measured to be 13,000 cps (LVT #4 spindle/12 RPM), for the 8.3% aqueous solution and 23,000 cps (LXT #4 spindle/12 RPM) for the 10% aqueous solution.

In a third comparative case it was attempted to prepare a 40 wt. % solution of CMC-7LX in water, however, upon addition of only about one-half of this quantity of the CMC to water a viscous paste was obtained that could not be stirred.

It was thus shown in this example that the present invention yielded a fluid form of CMC-7LX at significantly higher solids while at significantly lower viscosity compared to the prior art utilization of CMC aqueous solutions.

It was further found that, upon prolonged storage of two weeks, samples of the CMC-7LX aqueous solutions described above were observed to spoil with microbial discoloration and odor. In contrast to this, the suspension 0071-36-2 of the present invention remained fluid and in a usable form without evidencing microbial attack upon prolonged storage.

This example showed that the suspension of CMC in fatty acid of the present invention allowed the preparation of a higher solids fluid of CMC in a stable fluid form whereas the prior art use of CMC in aqueous solution form was limited by viscosity from preparing a high CMC solids pourable liquid. The ease of preparation of the present invention was also shown to be less time consuming and did not require additional stirring time as in the case of the aqueous solutions of the prior art to dissolve CMC lumps.

In addition, the present invention proved to be a means of preparing CMC in a fluid form that was storage stable for a prolonged period of time without showing microbial attack.

EXAMPLE 2

Experimental paper coatings were prepared by first preparing a clay slip then adding to portions of this master batch of clay slip in separate experiments measured amounts of styrene-butadiene latex as binder and various thickener samples to form the finished coatings.

The finished coatings were then measured for rheological characteristics such as Brookfield viscosity, Hercules Hi-Shear viscosity and S. D. Warren Water Retention.

The clay slip was prepared by adding 8.1 grams of Dispex N-40 dispersant (Allied Colloid Inc.) to 840 grams of water, then 2160 grams of Hydrasperse® kaolin clay (J. M. Huber) was dispersed in the water by high shear stirring with a Cowles mixer.

To form individual paper coatings for evaluation in each case, 416.7 grams of the above clay slip was mixed with 90 grams of Dow 620 SBR latex and then measured quantities of the test thickeners and water were added while stirring the coating with a paddle stirrer in a 1000 ml stainless steel beaker. Stirring of the final coating composition was conducted for 30 minutes in each case after which the rheological properties of the paper coatings were measured.

In a first case, 5.25 grams of the CMC-7LX suspension designated 0071-36-2 from Example 1 above was added to 416.7 grams of clay slip from above and 90 grams of Dow 620 latex along with 26.9 grams of water to form a 65% total solids paper coating. The CMC suspension of the present invention was observed to disperse readily into the paper coating upon addition and rapid thickening of the coating was then observed. At the end of the paper coating stirring period, its Brookfield viscosity, S. D. Warren Water Retention and Hercules Hi-Shear viscosity were measured as are shown in Table 1.

In a second test, 2.1 grams of dry powdered CMC-7LX (lot 9928-28) and 25.2 grams of water were added to 416.7 grams of clay slip described above and 90 grams of Dow 620 latex and stirred 30 minutes under identical conditions as in the first case to prepare a paper coating of 65% total solids in like fashion to case 1. In this second case, severe polymer lumps were observed to be present in the paper coating at the end of the mixing cycle. The Brookfield viscosity, S. D. Warren Water Retention and Hercules High-Shear viscosity of the coating were measured as shown in Table 1.

In a third test, 27.3 grams of a freshly prepared 8.2 wt. % CMC-7LX (lot 9928-28) aqueous solution described in Example 1 above was added to 416.7 grams of clay slip and 90 grams of Dow 620 latex and stirred 30 minutes under conditions identical to the first test to form a paper coating of 65% total solids with the properties described in Table 1.

As can be seen in the data of Table 1, the paper coating that was thickened with the CMC in fatty acid suspension of the present invention, designated 0071-36-2, produced significantly higher Brookfield viscosity and higher S. D. Warren Water Retention compared to either of the control tests. Even though these tests were conducted with identical quantities of total net CMC-7LX (lot 9928-28) added to the paper coating, it was unexpectedly found that the suspension product produced better performance in the key property of S.D. Warren Water Retention. High S. D. Warren Water Retention is well known in the paper industry to be desirable for improving the runnability of paper coatings.

It was thus demostrated that the present invention gave desirable improvements in thickening performance over the prior art utilization of CMC for thickening paper coatings.

TABLE 1

| | Paper Coating Properties | | | |
|---|---|---|---|---|
| | Brookfield Viscosity | Hercules Hi-Shear | | S. D. Warren Water |
| Thickener | cps #5 RVT/ 100 rpm | 23000 $sec^{-1}$ cps | 46000 $sec^{-1}$ cps | Retention sec. |
| Case 1 0071-36-2 0.7 Parts Active CMC-7LX Dosage | 2240 | 86.1 | 65.9 | 20 |
| Case 2 CMC-7LX Added Dry 0.7 Parts Active Dosage | 1600 | 72.2 | 61.1 | 16 |
| Case 3 CMC-7LX Lot 9928-28 8.3% Solution 0.7 Parts Active | 1720 | 69.5 | 55.5 | 16 |

TABLE 1-continued

| Thickener Dosage | Brookfield Viscosity cps #5 RVT/ 100 rpm | Hercules Hi-Shear 23000 sec$^{-1}$ cps | Hercules Hi-Shear 46000 sec$^{-1}$ cps | S. D. Warren Water Retention sec. |
|---|---|---|---|---|

Paper Coating Properties

EXAMPLE 3

A series of paper coatings were prepared similar to those in Example 2 except that in this case a somewhat different paper coating formulation was employed.

A 70% solids master batch of clay slip consisting of 2000 grams Hydrafine ® #1 kaolin clay (J. M. Huber), 7.5 grams Dispex N-40 (Allied Colloids), and 849.6 grams of water was prepared by similar methodology as in Example 2. Test coatings were then prepared by mixing in each case 428.6 grams of the clay slip master batch with 90 grams of Dow 620 SBR latex, 6 grams of Flowco (Henkel Process Chemicals) calcium stearate, 0.3 grams of Foamaster VF defoamer (Henkel Process Chemicals) and measured amounts of thickener and water as given below.

Two different coatings were prepared employing as thickeners two different forms of CMC.

In the first test case, 6.00 grams of the CMC in fatty acid suspension of the present invention, designated 0071-36-2, was added directly to the above coating formulation along with 27 grams of water to form a paper coating formulation of 63% solids and stirred for 30 minutes. The paper coating was observed to thicken rapidly upon addition of the CMC suspension and after completion of the mixing cycle the paper coating was measured to exhibit the Brookfield viscosity, S. D. Warren Water Retention and Hercules Hi-Shear Viscosity as shown in Table 2.

In the control case, a freshly prepared 10% solution of CMC-7LX (lot 9928-28) in water, as described in Example 1, was added in a proportion of 30 grams along with 0 grams of water to form a 63% solids paper coating formulation and stirred, then tested in like fashion as the first case. In comparing Case 1 to Case 2 in this example, a lower active dosage of the CMC thickener was employed in the case of the CMC in fatty acid suspension.

The test results for the two experimental coatings are summarized in Table 2.

TABLE 2

Paper Coating Properties

| Thickener | Brookfield Viscosity cps #5 RVT/ 100 rpm | Hercules Hi-Shear 23000 sec$^{-1}$ cps | Hercules Hi-Shear 46000 sec$^{-1}$ cps | S. D. Warren Water Retention sec. |
|---|---|---|---|---|
| Case 1 0071-36-2 Thickener 0.8 Parts Active CMC-7LX Dosage | 2200 | 90.3 | 70.8 | 22 |
| Case 2 10% CMC Aqueous | 2160 | 86.1 | 67.3 | 16 |
| Thickener 1.0 Parts Active CMC-7LX Dosage | | | | |

As shown in Table 2, it was found in this example that the CMC-7LX in fatty acid liquid suspension of the present invention produced higher S. D. Warren Water Retention results than the same CMC-7LX lot when employed in aqueous solution form. Of particular importance, the CMC in fatty acid suspension of the present invention unexpectedly produced these improved results at lower active CMC polymer dosage added to the paper coating. This example thus demonstrated improved dosage-effectiveness of CMC thickener suspended in fatty acid when employed as a paper coatings thickener.

This example also showed that the improvement in paper coating properties produced by the CMC in fatty acid suspension over the control CMC aqueous solution case that was first demonstrated in Example 2 is a generalized phenomenon that can be demonstrated in various paper coating formulations.

EXAMPLE 4

Polyacrylamide, polyvinylpyrrolidone, polyvinylalcohol, polyethylene oxide, xanthan, guar, hydroxypropylguar, cationic hydoxyethylcellulose, hydroxyethylcellulose, sodium alginate and Carbopol ® acrylamide crosslinked polymer will form similar fatty acid suspensions as previously illustrated for CMC.

What is claimed is:

1. A fluid suspension comprising 35 to 55 parts of at least one water soluble polymer with a 1 to 150 micron average size selected from the group of hydroxyethylcellulose (HEC), carboxymethylcellulose (CMC), methylcellulose (MC), hydroxypropylmethylcellulose (HPMC), ethylhydroxyethylcellulose (EHMC), hydrophobically modified hydroxyethylcellulose (HMHEC), hydrophobically modified ethylhydroxyethylcellulose (HMEHEC), cationic hydroxyethylcellulose (CATHEC), guar, carboxymethylguar (CMGUAR) and hydroxypropylguar (HPGUAR) dispersed and suspended in 40 to 55 parts by weight of a fatty acid liquid carrier and 1 to 5 parts by weight of an organoclay stabilizing agent and 1 to 20 parts by weight of an oil in water emulsifier.

2. The fluid suspension of claim 1 where the organoclay stabilizing agent is bentonite clay stabilized with dimethyldioctadecylammonium ion.

3. The fluid suspension of claim 2 where the fatty acid liquid carrier contains a mixture of oleic and linoleic acid.

4. The fluid suspension of claim 3 where the oil in water emulsifier is a nonionic compound.

5. The fluid suspension of claim 4 further containing amorphous silica.

6. The fluid suspension of claim 5 where the polymer is CMC with a D.S. of 0.65–0.80.

7. The fluid suspension of claim 5 where the polymer is HEC or HMHEC.

8. The fluid suspension of claim 5 where the polymer is EHEC or HPMC.

* * * * *